(12) United States Patent
Tanaka et al.

(10) Patent No.: US 6,266,810 B1
(45) Date of Patent: Jul. 24, 2001

(54) REMOTE PROGRAM DOWNLOADING SYSTEM AND APPARATUS

(75) Inventors: Hirofumi Tanaka, Hyogo; Koichi Yasutake, Nagaokakyo; Tetsuji Maeda, Nara, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/062,482

(22) Filed: Apr. 17, 1998

(30) Foreign Application Priority Data

Apr. 17, 1997 (JP) .................................... 9-099911

(51) Int. Cl.7 .................................... G06F 9/445
(52) U.S. Cl. .................... 717/11; 717/1; 717/10
(58) Field of Search .................... 395/708, 709, 395/710, 712; 717/11, 10, 1

(56) References Cited

U.S. PATENT DOCUMENTS

| | | | | |
|---|---|---|---|---|
| 4,788,637 | * | 11/1988 | Tamaru | 709/221 |
| 4,954,941 | * | 9/1990 | Redman | 717/11 |
| 5,003,591 | * | 3/1991 | Kauffman et al. | 380/10 |
| 5,155,847 | * | 10/1992 | Kirouac et al. | 395/200.51 |
| 5,430,877 | * | 7/1995 | Naylor | 717/11 |
| 5,432,927 | | 7/1995 | Grote et al. . | |
| 5,467,286 | * | 11/1995 | Pyle et al. | 364/483 |
| 5,768,539 | * | 6/1998 | Metz et al. | 709/249 |
| 5,787,288 | * | 7/1998 | Nagata et al. | 717/11 |
| 5,815,722 | * | 9/1998 | Kalwitz et al. | 395/712 |
| 5,937,198 | * | 8/1999 | Nelson et al. | 717/11 |

FOREIGN PATENT DOCUMENTS

| | | |
|---|---|---|
| 0 732 850 | 9/1996 | (EP) . |
| 5-158703 | 6/1993 | (JP) . |
| 6-4294 | 1/1994 | (JP) . |
| 6-214894 | 8/1994 | (JP) . |

OTHER PUBLICATIONS

European Search Report for Int'l Appln No. 98106922 dated Aug. 31, 1998.

* cited by examiner

Primary Examiner—Tariq R. Hafiz
Assistant Examiner—Ted T. Vo
(74) Attorney, Agent, or Firm—Ratner & Prestia

(57) ABSTRACT

For updating the entire region of the control software stored in the memory of the information terminal, the invention provides a system and apparatus for remote program downloading characterized by downloading a download process program exclusive for downloading process in a region indifferent to download process by using control software at the terminal, downloading the download process program portion of the control software to be updated by using this exclusive download process program, and finally, by using this download process program, downloading the program other than the download process program portion of the control software to be updated.

10 Claims, 9 Drawing Sheets

| Packet type p | Packet type p | Packet type p |
|---|---|---|
| Program packet | Program packet | Program packet |
| Program type | Program type | Program type |
| Download process program | Download process program | Non-download process program |
| (Exclusive for downloading time) | (For normal type) | |
| Address information | Address information | Address information |
| Address A0000h | Address 10000h | Address 60000h |
| Size information | Size information | Size information |
| 50000h bytes | 50000h bytes | A0000h bytes |
| Program main body | Program main body | Program main body |
| Download process program | Download process program | Non-download process program |

FIG. 3A

| Packet type p | Program packet |
|---|---|
| Program type | Download process program (Exclusive for downloading time) |
| Address information | Address A0000h |
| Size information | 50000h bytes |
| Program main body | Download process program |

FIG. 3B

| Packet type p | Program packet |
|---|---|
| Program type | Download process program (For normal type) |
| Address information | Address 10000h |
| Size information | 50000h bytes |
| Program main body | Download process program |

FIG. 3C

| Packet type p | Program packet |
|---|---|
| Program type | Non-download process program |
| Address information | Address 60000h |
| Size information | A0000h bytes |
| Program main body | Non-download process program |

FIG. 5A

| Packet type p<br>Program packet |
| --- |
| Program type<br>Download process program<br>(Exclusive for downloading time) |
| Address information<br>Address A0000h |
| Size information<br>50000h bytes |
| Version information<br>11 |
| Program main body<br>Download process program |

FIG. 5B

| Packet type p<br>Program packet |
| --- |
| Program type<br>Download process program<br>(For normal type) |
| Address information<br>Address 10000h |
| Size information<br>50000h bytes |
| Version information<br>11 |
| Program main body<br>Download process program |

FIG. 5C

| Packet type p<br>Program packet |
| --- |
| Program type<br>Non-download process program |
| Address information<br>Address 60000h |
| Size information<br>A0000h bytes |
| Version information<br>11 |
| Program main body<br>Non-download process program |

FIG. 6A

| |
|---|
| Packet type p<br>Program packet |
| Program type<br>Download process program<br>(Exclusive for downloading time) |
| Address information<br>Address A0000h |
| Size information<br>50000h bytes |
| Version information<br>11 |
| Product information<br>B |
| Program main body<br>Download process program |

FIG. 6B

| |
|---|
| Packet type p<br>Program packet |
| Program type<br>Download process program<br>(For normal type) |
| Address information<br>Address 10000h |
| Size information<br>50000h bytes |
| Version information<br>11 |
| Product information<br>B |
| Program main body<br>Download process program |

FIG. 6C

| |
|---|
| Packet type p<br>Program packet |
| Program type<br>Non-download process program |
| Address information<br>Address 60000h |
| Size information<br>A0000h bytes |
| Version information<br>11 |
| Product information<br>B |
| Program main body<br>Non-download process program |

FIG. 7A

| Packet type p<br>Program packet |
|---|
| Program type<br>Download process program<br>(Exclusive for downloading time) |
| Address information<br>Address A0000h |
| Size information<br>50000h bytes |
| Version information<br>11 |
| User information<br>X |
| Program main body<br>Download process program |

FIG. 7B

| Packet type p<br>Program packet |
|---|
| Program type<br>Download process program<br>(For normal type) |
| Address information<br>Address 10000h |
| Size information<br>50000h bytes |
| Version information<br>11 |
| User information<br>X |
| Program main body<br>Download process program |

FIG. 7C

| Packet type p<br>Program packet |
|---|
| Program type<br>Non-download process program |
| Address information<br>Address 60000h |
| Size information<br>A0000h bytes |
| Version information<br>11 |
| User information<br>X |
| Program main body<br>Non-download process program |

FIG. 9A

| Packet type p | Program packet |
|---|---|
| Program type | Download process program (Exclusive for downloading time) |
| Address information | Address A0000h |
| Size information | 50000h bytes |
| Program main body | Download process program |

FIG. 9B

| Packet type p | Program packet |
|---|---|
| Program type | Download process program (For normal type) |
| Address information | Address 10000h |
| Size information | 50000h bytes |
| Program main body | Download process program |

FIG. 9C

| Packet type p | Program packet |
|---|---|
| Program type | Non-download process program |
| Address information | Address 60000h |
| Size information | A0000h bytes |
| Check sum information | 1001 |
| Program main body | Non-download process program |

REMOTE PROGRAM DOWNLOADING SYSTEM AND APPARATUS

FIELD OF THE INVENTION

The present invention relates to a method and apparatus for updating software of computer applied product through a transmission channel, and more particularly to a system and apparatus for updating control software of a digital television receiver for receiving video, audio and data through wired and/or wireless digital transmission channels.

BACKGROUND OF THE INVENTION

In a simple information terminal not provided with an auxiliary memory device, control software is stored in a ROM that is not rewritable, and to update this control software, the ROM must be replaced, which is very difficult if multiple products are present in the market. For flexible changing of control software, the so-called "program downloading system" is known, in which system the control software is stored in a RAM instead of the ROM and transmtted from the central processing apparatus of the system through a transmission channel. In this system, even if it is not necessary to change the software, transmission is always required when turning on the power source or when recovering from abnormal state of the terminal. To eliminate such wasteful transmission when turning on the power source, a method for storing the control software in the EEPROM instead of the RAM is proposed (for example, "Program downloading system" in Japanese Laid-open Patent No. 6-4269). In this method, it is impossible to change the download processing portion of the control software.

It is also proposed to prepare two sets of EEPROM, and download the control software for updating in a spare EEPROM while managing by the working EEPROM ("Remote software downloading system" in Japanese Laid-open Patent No. 5-158703). According to this system, if an abnormality occurs while downloading, since the working control software remains intact, it is a benefit that downloading into the spare EEPROM can be resumed, and another merit is that the download processing portion of the control software can be changed. A demerit is, however, that the cost is high because two sets of EEPROM are used.

Further, concerning the digital television receiver, in order to cope with extension of functions flexibly, it is proposed to store the basic function portions of the control software in the ROM, and store the extension portions of the control software corresponding to the extended functions in the EEPROM ("Data reception processing apparatus, data reception processing method, and broadcasting method" in Japanese Laid-open Patent No. 8-195952). Branching means to a predicted extension function is prepared permanently in the basic function portions of the control software stored in the ROM, and the extended portions of the control software are downloaded in the EEPROM by using the data transmission stream contained in the digital broadcasting channel. This system is advantageous in that it is flexible to cope with predicted extensions, but as for the extension not predicted, it is necessary to change the basic functional portions stored in the ROM, which requires replacement of ROM, and hence it is not a radical solution.

SUMMARY OF THE INVENTION

It is hence an object of the invention to update the entire region of control software by downloading, by using only one set of EEPROM, so as to be capable of coping with any extension of the control software including changes of basic functions. It is other object to be capable of restoring and resuming if there is abnormality when downloading, in order to execute downloading securely, even by using a digital transmission channel of digital television broadcast using a wireless transmission which is likely to be influenced by disturbance such as noise. It is a different object to update the control software flexibly, depending on the type of the product used by the customer, receiving trend of the customer, or contract situation of paid program of the customer.

The invention provides a method of extending or changing the functions of the receiver as a result, by updating the control software stored in the memory of digital television receiver by using data signal contained in broadcast signal.

First, the working control software takes out the temporary download processing program exclusive for downloading for receiving and storing data from transmitted data packets, and stored in a working region of a memory not interfering the present downloading process. When storing is over, the control is transferred to this temporary download processing program, and this temporary download processing program takes out the new download processing program for composing the stem portion of the update control software, and stores in a specified region. In consequence, the control is shifted to this new download processing program, and the new non-download processing program for composing the remaining portion of the update control software is taken out, and stores in a region once occupied by the temporary download processing program. When this storing is over, the control is returned to the update control software. In this way, the control software in the memory is updated, and the operation as the television receiver having the updated function is resumed.

In the program downloading apparatus of the invention described herein, arbitrary updating is possible in all program region of the control software. Besides, at any moment of updating, since the download program for receiving data and storing data is working, it is possible to resume if there is abnormality during data reception. Moreover, the EEPROM or the like that is not erased when the power is cut off is used in the memory, it is possible to resume if the power is interrupted in the apparatus during updating.

Moreover, by making use of designate information (including designation of group and non-designation) of product, user and version of program which is to be updated or in transmission in the program packet, automatic updating is enabled, and also while efficiently utilizing the digital transmission channel, the control software can be updated accurately and with propriety in small units for the group of products or users, or even for individual product or individual person.

Furthermore, by returning the success or failure of downloading of program to the sender, the terminal state can be controlled at the sender side, or by returning the error statistics to the sender, it may be useful for improving the control software at the sender side.

Owing to these merits, the utility is enhanced not only at the information terminals, but also in the entire system, and in particular the utility, reliability and maintainability of digital television system are enhanced, which may contribute greatly to its popularity and expansion of service.

BRIEF DESCRIPTION OF THE DRAWINGS

FIG. 3 is an explanatory diagram showing a data packet structural example when downloading a program by the remote program downloading apparatus in embodiment 1 of the invention.

FIG. 5 is a structural example of a packet adding version information to the data packet flowing in a digital transmission channel.

FIG. 6 is a structural example of a packet adding version information and product information to the data packet flowing in a digital transmission channel.

FIG. 7 is a structural example of a packet adding version information and user information to the data packet flowing in a digital transmission channel.

FIG. 9 is a structural example of a packet adding check sum information to the data packet flowing in a digital transmission channel.

DETAILED DESCRIPTION OF THE INVENTION

Figure 1:
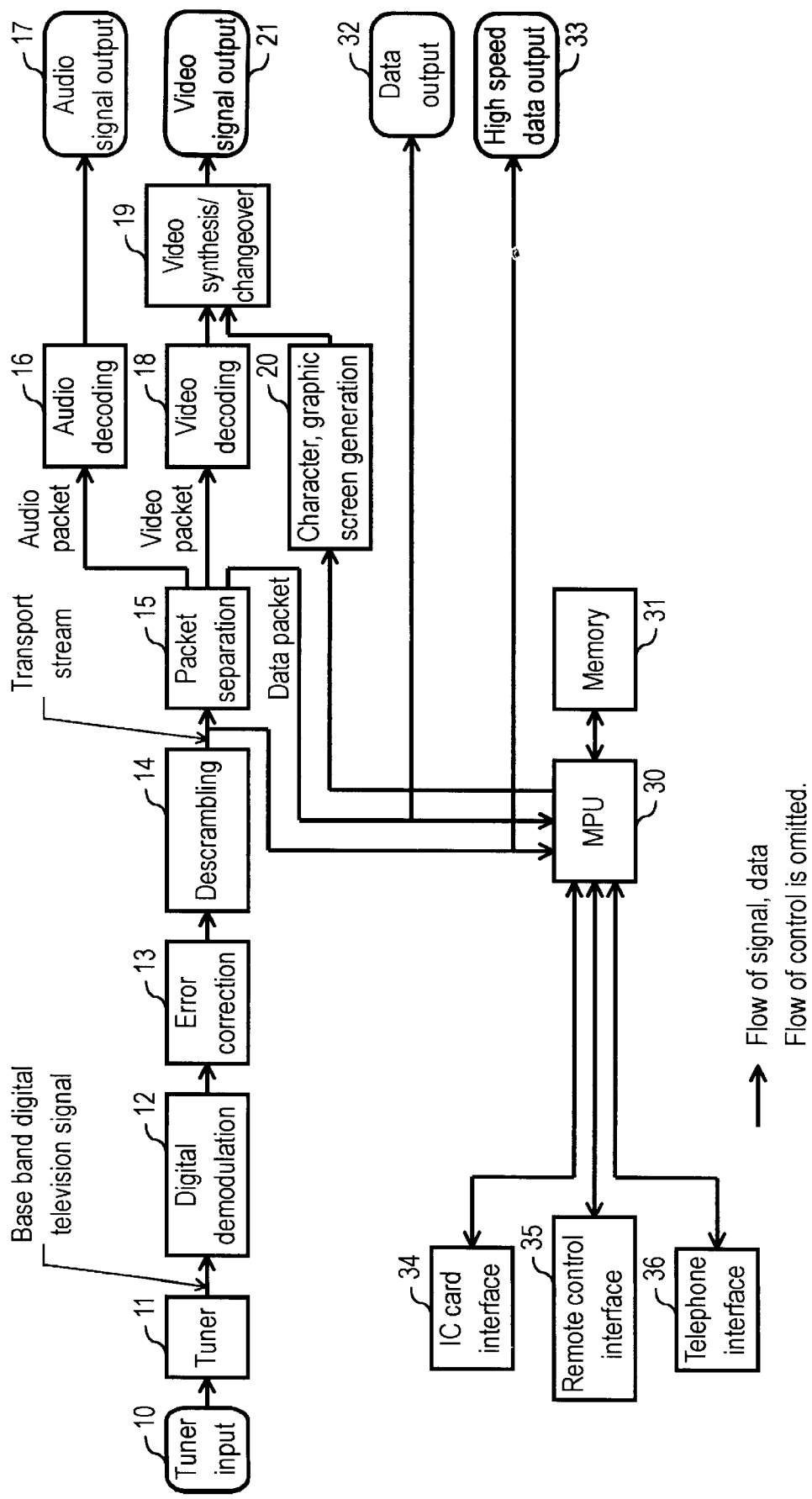
FIG. 1 is an example of functional block diagram of digital television receiver.

FIG. 1 shows an example of functional block diagram of digital television receiver. A tuner input 10 is connected to any one of a converter for satellite broadcast, a ground wave antenna, or an input of CATV, or through a switch for changing them over, and receives a digital television signal modulated by high frequency carrier wave. A tuner 11 receives an input signal, and selects a band including a desired program, amplifies and demodulates, and delivers a digital television signal digitally modulated in the base band. This signal undergoes digital demodulation 12 and error correction 13. Consequently, if ciphered, by using a decoding key which is preliminarily stored in an IC card and given to the subscribed user, for taking into the receiver through an IC card interface 34, decoding, that is, descrambling 14 is processed, thereby obtaining a transport stream in compound structure for transmission consisting of plural packets of digitized videos, audios and data, and control data. As a matter of course, if the decoding key is not available or if the decoding key is inappropriate, due decoding cannot be done. By packet separation 15, the packet of videos, audio and data is separated from the transport stream, and the packet of videos and audios of desired program is selected, decoded and expanded by video decoding 18 and audio decoding 16, and video signal and audio signal output 17 are obtained. The transport stream may also include a data packet for transmitting various data such as key data for decoding, other characters for program list or program related information, or graphic data. The character and graphic data are taken into an MPU 30, and the character code is converted into a character pattern and the graphic data into graphic pattern in character and graphic screen generation 20, thereby generating screen signals, which are mixed with said video signal or changed over in video synthesis/changeover 20, and a video signal output 21 is obtained. From such video signal output 21 and audio signal output 17, an analog television signal may be generated to feed an analog television receiver, or the video signal output 21 may be also directly added to a display unit to display on a screen, while a sound output can be obtained from the audio signal output 17 through a sound converter or a loudspeaker. This data packet can also handle the program data described below in relation to the invention. Incidentally, when transmitting data signals at high speed, all of the transport stream may be assigned for data.

There are many choices in function concerning the above band selection, demodulation of modulated carrier wave, digital demodulation, error correction, descrambling, packet separation, video and audio decoding, and generation and display method of characters and graphics, and usually the method suited to the characteristic of the program to be expected to receive by the transmitter or the broadcaster, is selected and executed. The display method may be also selected by the viewer. Of course, the best method within the restrictions in function and performance of the receiver is selected. The MPU 30, aside from the above generation of screen, also selects each one of the functions mentioned above and controls the whole on the control software in the memory 31. In FIG. 1, the flow of principal signals and data is indicated by arrow, but the control flow is omitted.

The independent or integrating function with video and audio transmission in data transmission of digital television system is being tested and experimented for practical development of ISDB (integrated services digital broadcasting). For the betterment of life and culture by integration of picture, sound and data, its development is highly expected, and along with development of new functions, it gives rise to necessity of updating of the control software, including the control of combination of functional choices.

[Embodiments]

The updating method and apparatus of control software are described in detail by referring to embodiments.

Figure 2:
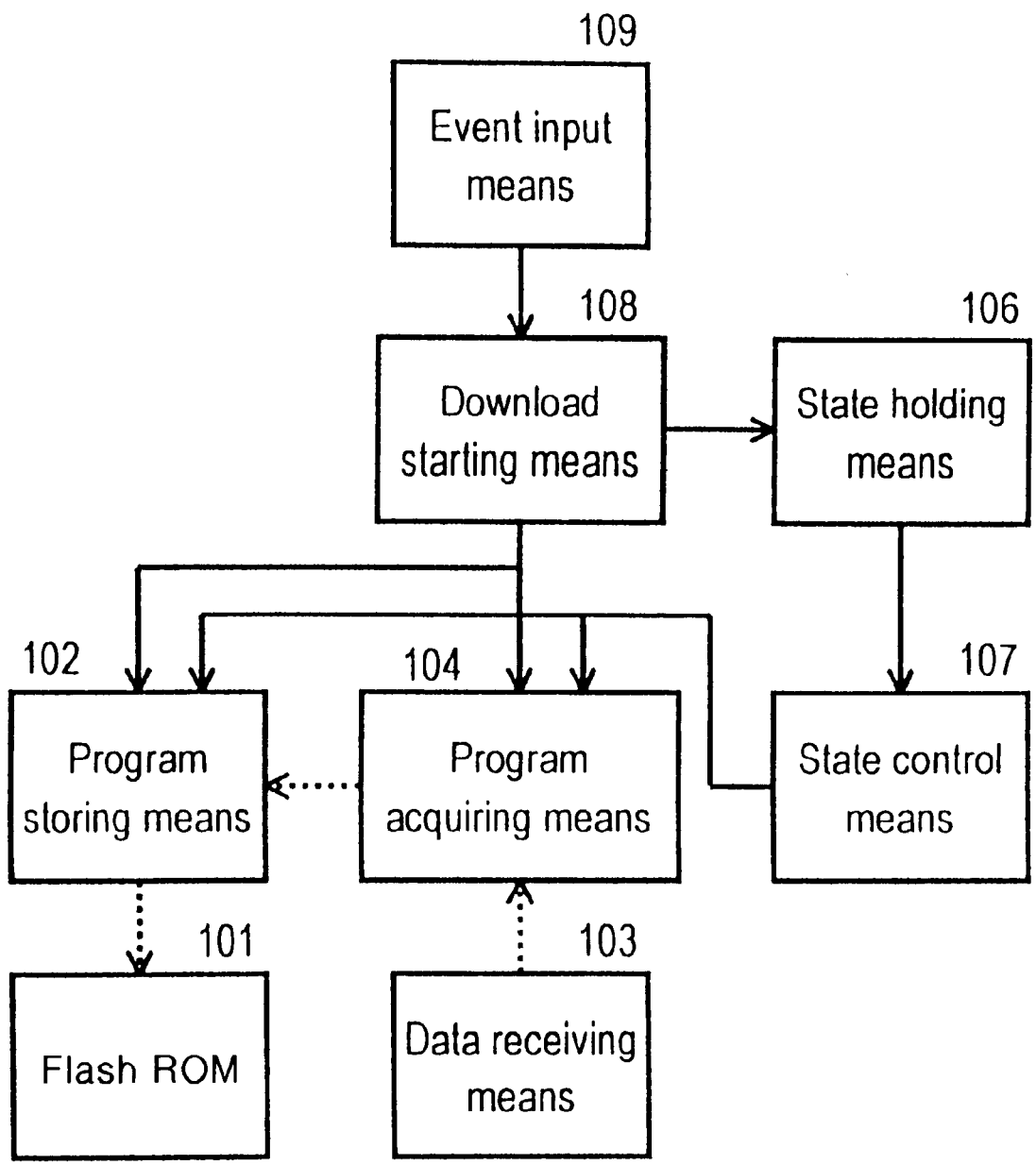
FIG. 2 is a system block diagram of a remote program downloading apparatus in embodiment 1 of the invention.

FIG. 2 is a system block diagram of a remote program downloading apparatus in embodiment 1 of the invention. In FIG. 2, reference numeral 101 is a flash ROM which is a kind of EEPROM for storing program and others, 102 is a program storing means for storing a program in the flash ROM 101 in an executable format, 103 is data receiving means for receiving data packet, 104 is program acquiring means for interpreting the data packet, and reading the program control information such as program configuration address information and size information having the designated program type and the program itself into its own buffer memory, and 106 is state holding means for holding the state during downloading process of the program. Reference numeral 107 is state control means for setting and controlling the functions of the data receiving means 103, program acquiring means 104 and program storing means 102 as shown in Table 1, according to the state held by the state holding means 106. Reference numeral 108 is download starting means for changing the state held by the state holding means 106, starting the program acquiring means 104 and program storing means 102 for executing the download processing set by the state control means 107, and completing download processing upon completion of storing process of the program in a third state, and 109 is event input means for detecting a program download request from the operator through an input device such as remote controller, and requesting start to the download starting means 108. In FIG. 2, the flow of reception data and program is indicated by dotted line arrow, and the flow of main control is indicated by solid line arrow. The data receiving means 103 corresponds to the descrambling 14 or packet separation 15 for delivering the data packet to the MPU 30 in FIG. 1, the flash ROM 101 corresponds to the memory 31 in FIG. 1, and the program storing means 102, program acquiring means 104, state holding means 106, state control means 107, download starting means 108, and event input means 109 are the functions realized by the MPU 30 in FIG. 1 together with the control software in the memory 31.

In addition, actually, it requires means for excluding competition of various resources in download processing during system operation, but others are omitted because they are not related to the main object of the invention.

FIG. 3 is an explanatory diagram for showing a structural example of data packet when downloading the program by the remote program downloading apparatus of the invention, and Table 1 shows the relation of the state of the state holding means 107, with the download processing program to be made active and the program to be downloaded in the program acquiring means 104 and program storing means 102, to be set and controlled by the state control means 106.

TABLE 1

State control of downloading apparatus

| State name | | Download program to be made active | Program to be downloaded |
|---|---|---|---|
| Normal state | | Download processing program (of present control software) | (Video, audio and data signals, etc.) |
| Downloading process | State 1 | Normal download processing program (download processing program as above) | Temporary download processing program (download processing program exclusive for downloading time) |
| | State 2 | Temporary download processing program (download processing program exclusive for downloading time) | New download processing program (of update control software) |
| | State 3 | New download processing program (of update control software) | New non-download processing program (of update control software) |

Figure 4:
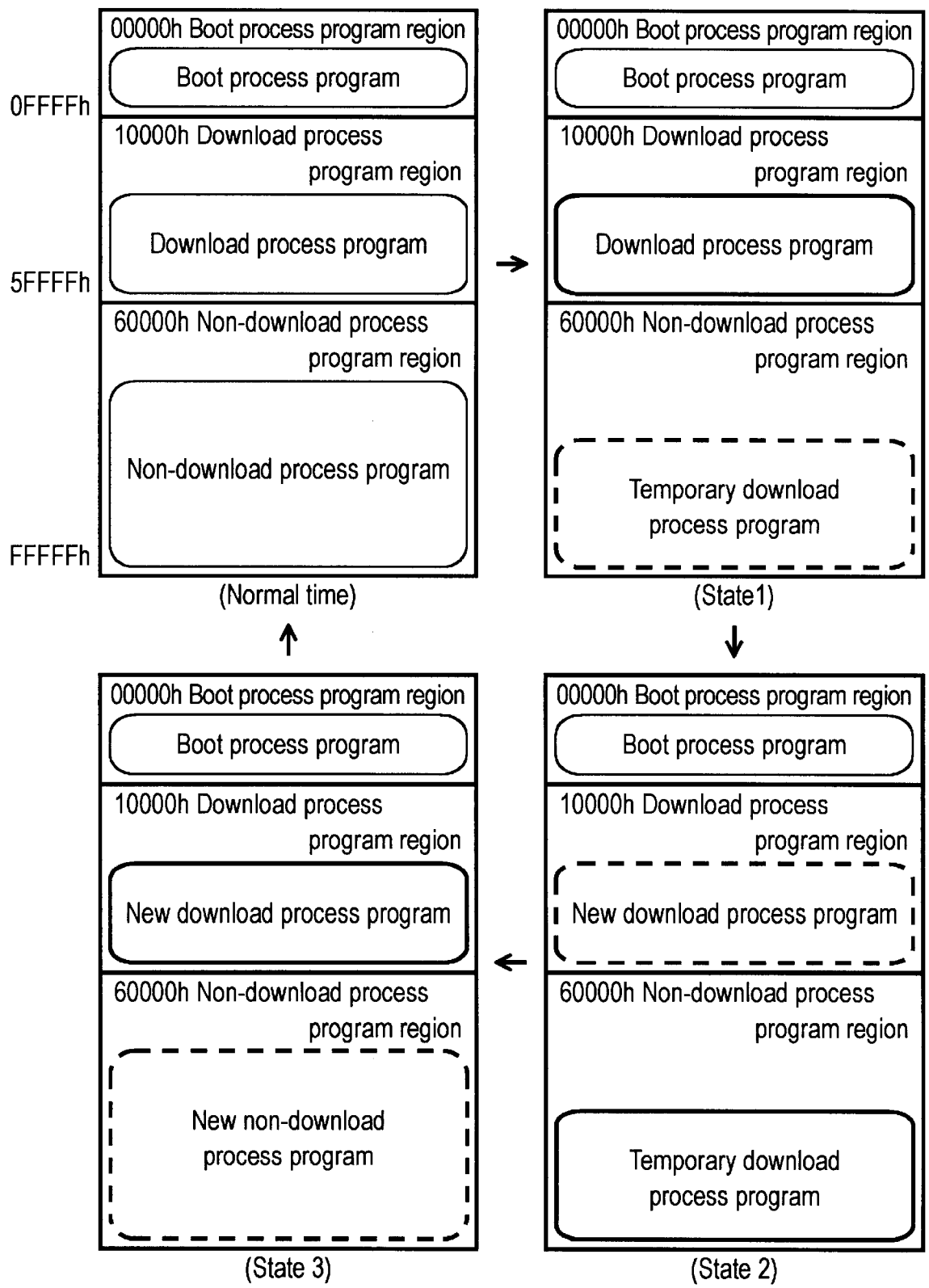
FIG. 4 is an explanatory diagram showing an allocation example on flash ROM in each state during downloading of program in remote program downloading apparatus in embodiment 1 and embodiment 2 of the invention.

FIG. 4 is an explanatory diagram showing an allocation example of flash ROM 101 (of capacity of 1M byte) in each state during download of the program in the remote program downloading apparatus. In this example, the area from address [00000]h to address [0FFFF]h of the flash ROM 101 is a boot process program region (program for various initializing processes, and program region necessary for realizing download starting means 108, state holding means 106, and state control means 107), the area from address [10000]h to address [5FFFF]h is a download process program region (of the control software, the program necessary for realizing various functions intrinsic to the product such as digital image and other receiving processing program, and closely related download process program, that is, the program region necessary for realizing the data receiving means 103, program storing means 102, and program acquiring means 104), and the area from address [60000]h to address [FFFFF]h is a non-download process program region (of the control software, the program necessary for realizing various accessory functions for the products not closely related with the download process program such as service program and font data program, and work space).

The operation is described below. First, the operator presses a key of the remote control to instruct updating of control software, that is, to instruct download, then the event input means 109 detects the request, and gives a start request to the download starting means 108.

Step 1) The download starting means 108 changes the state of the state holding means 106 from the normal state to state 1 in downloading process. The state control means 107, in state 1 of the state holding means 106, sets the data receiving means 103, program acquiring means 104, and program storing means 102. That is, as shown in state 1 in Table 1 and FIG. 4, the download process program (of the present control software) stored in the download process program region is made active, and the program type of the program to be downloaded is set in the temporary download process program exclusive for downloading time (in FIG. 4, the area within thick lines indicates the active download process program, and the area within dotted line shows the program to be downloaded). Consequently, the download starting means 108 starts the program acquiring means 104. The program acquiring means 104 extracts, out of the data packet received in the data receiving means 103, a packet of which packet type shown in FIG. 3(*a*) is a program packet and program type is the temporary download process program exclusive for downloading time, and reads the packet into the buffer memory. In succession, the download starting means 108 starts the program storing means 102, which stores only the program main body into the non-download process program region in the flash ROM 101 on the basis of the address information and size information in the packet read into the buffer memory.

Step 2) Then, the download starting means 108 changes the state of the state holding means 106 to state 2 in downloading process. The state control means 107 sets the data receiving means 103, program acquiring means 104, and program storing means 102 on the basis of state 2 of the state holding means 106. That is, as shown in state 2 in Table 1 and FIG. 4, the temporary download process program exclusive for downloading time stored in the non-download process program region is made active, and the program type of the program to be downloaded is set in the new download process program (of update control software) for normal time. The download starting means 108 starts the program acquiring means 104. The program acquiring means 104 extracts, out of the data packet received in the data receiving means 103, a packet of which packet type shown in FIG. 3(*b*) is a program packet and program type is the new download process program (of update software) for normal time, and reads the packet into the buffer memory. In succession, the download starting means 108 starts the program storing means 102, which stores the program main body read in the buffer memory into the download process program region in the flash ROM 101 on the basis of the address information and size information in the program packet.

Step 3) Consequently, the download starting means 108 changes the state of the state holding means 106 to state 3 in downloading process. The state control means 107, in state 3 of the state holding means 106, sets the data receiving means 103, program acquiring means 104, and program storing means 102. That is, as shown in state 3 in Table 1 and FIG. 4, the new download process program (of the update control software) stored in the download process program region at the present moment is made active, and the program type of the program to be downloaded is set in the new non-download process program (of the update control software). Consequently, the download starting means 108 starts the program acquiring means 104. The program acquiring means 104 extracts, out of the data packet received in the data receiving means 103, a packet of which packet type shown in FIG. 3(*c*) is a program packet and program type is the new non-download process program (of the update control software), and reads the packet into the buffer memory. In succession, the download starting means 108 starts the program storing means 102, which stores only the program main body into the non-download process program region in the flash ROM 101 on the basis of the address information and size information in the packet read into the buffer memory.

When this storing is over, the state held in the state holding means 106 is changed to the normal state, and the update control software is started, so that a series of downloading process is completed.

As described herein, in the remote program downloading apparatus in embodiment 1 of the invention, when the download starting means 108 is in state 1, the download process program is started and the temporary download process program is downloaded into the non-download process program region; in the case of state 2, the temporary download process program is started and the new download process program is downloaded into the download process program region; and in the case of state 3, the new download process program is started and the new non-download process program is downloaded. Therefore, the download process program is always present without being spoiled, if a trouble occurs during download, the download starting means 108 can resume the download process program active at the time of occurrence of trouble and continue download process.

In the above explanation, the entire program is read in batch from the program acquiring means 104 into its own buffer memory, and stored in the flash ROM by the program storing mans 102, but it may be divided depending on the available vacant memory capacity or other restrictions. The transfer of the state effected by the download starting means 108 is continuous, but it may be also designed to reboot the system when transferring the state. Moreover, the layout of regions on the flash ROM 101 is fixed in the explanation, but it may be also determined dynamically depending on the address information and size information in the transmitted program packet, or by the download process program.

Moreover, the state transition executed through the state holding means 106 and the state control effected by the state control means 107 may be also incorporated into the individual download process programs. In this case, at step 2), the boot process program region in FIG. 3 may be also updated.

At steps 1) to 3), the program type to be downloaded is selected from the packet of which packet type is a program packet. Further, by adding necessary items in the transmitted program packet, such as the product, version of software to be updated and user, objects of updating may be selected either alone or in combination (including group designation, non-designation), and by processing the downloading for selecting and extracting the packet when any one of the transmitted information such as product information, user information, and version information of the program to be updated, or a specific combination thereof agrees with the present terminal information, and only when different from the present program version information if the version information of the transmission program itself is added, more accurate and flexible updating of the control software is realized. That is, a different control software can be presented for each product, each product group, each version number of software, every plural versions, each specific user group, or each specific individual person. FIG. 5 shows an example of packet adding only version information, FIG. 6 shows an example of packet adding version information and product information in combination, and FIG. 7 shows an example of packet adding version information and user information in combination.

Figure 8:
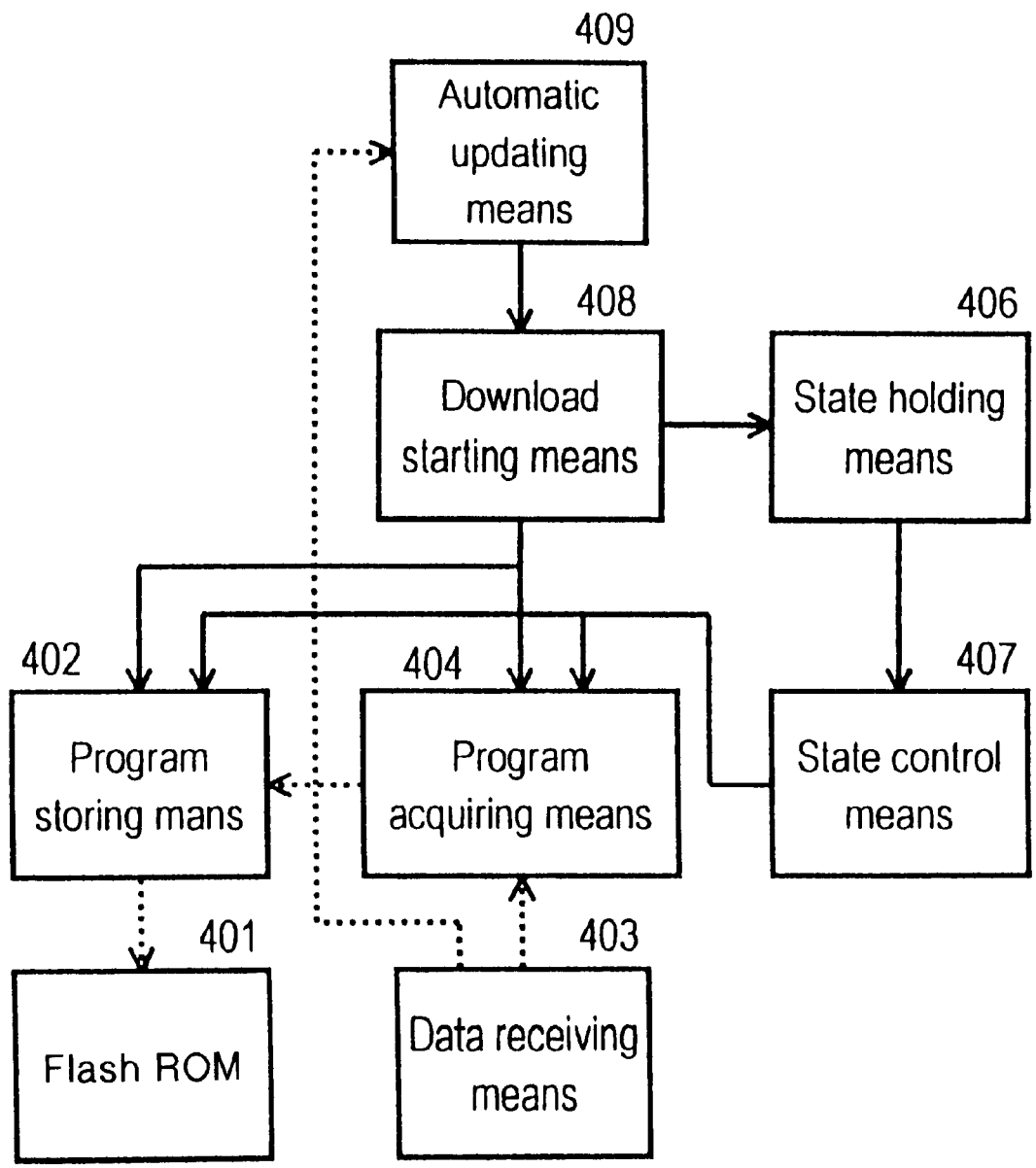
FIG. 8 is a system block diagram of the remote program downloading apparatus in embodiment 2 of the invention.

Moreover, as shown in the constitution in embodiment 2 in FIG. 8, by always or periodically monitoring the product information, the version information of the software or the user information included in the arriving program packet by automatic updating means 409, the download starting means 408 is started when any one of the transmitted information such as product information, user information, and version information of the program to be updated, or a specific combination thereof agrees with the present terminal information, and only when different from the present program version information if the version information of the transmission program itself is added, and by operating same as in embodiment 1, an automatic downloading apparatus not requiring user's manipulation is realized.

Still more, by block inspection of the downloaded program, its validity is inspected, and the presence or absence of abnormal state may be immediately noticed to the sender through a telephone interface 36 in FIG. 1. Alternatively, by transmitting the data of block inspection result in a specific method of the program main body, in the program packet, block inspection in the same method is effected in the downloaded program, and the result is compared with the transmitted data, so that abnormality may be noticed to the sender if disagreeing. FIG. 9 shows an example of packet adding check sum information as an example of block inspection result.

Furthermore, by sending back error statistics information or the like depending on the maintenance control packet sent from the sender for action state analysis of the updated control software, it may be used for improvement of the control software at the sender side.

The description herein relates to the digital television receiver, but it may be applied also in updating of software stored in the memory of any general information terminal.

In the program downloading apparatus of the invention described herein, all the memory region of the control software may be updated arbitrarily. At any moment of updating, since the download process program for receiving data and storing data is always working without any partial loss, it is possible to resume if there is abnormality during data reception. Besides, since the memory is the EEPROM or the like that is not erased if the power is cut off, it is possible to resume if the apparatus power source is interrupted during updating.

Moreover, by making use of designation (including group designation, non-designation) of the product, user, or the version of the program to be updated or the transmission program itself, in the program packet, automatic updating is also enabled, and also by efficiently utilizing digital transmission channel, the control software can be updated accurately and with propriety in a small unit, such as product group or user group, or individual product or individual user Also by sending back success or failure of program downloading to the sender, the terminal state can be controlled at the sender side, or by sending back the error statistics to the sender, it may be useful for improvement of the control software at the sender side.

Owing to these advantages, the utility is enhanced not only at the information terminals, but also in the entire system, and in particular the utility, reliability and maintainability of digital television system are enhanced, which may contribute greatly to its popularity and expansion of service.

FIG. 1

10 Tuner input

11 Tuner

Base band digital television signal
12 Digital demodulation
13 Error correction 14 Descrambling
Transport stream
15 Packet separation
Data packet
Audio packet
Video packet
16 Audio decoding
17 Audio signal output
18 Video decoding
19 Video synthesis/changeover
20 Character, graphic screen generation
21 Video signal output
31 Memory
32 Data output
33 High speed data output
34 IC card interface
35 Remote control interface
36 Telephone interface
Flow of signal, data
Flow of control is omitted.
FIG. 2
101 Flush ROM
102 Program storing mans
103 Data receiving means
104 Program acquiring means
106 State holding means
107 State control means
108 Download starting means
109 Event input means
Flow of reception data and program
Flow of control
FIG. 8
409 Automatic updating means
FIG. 3
(a)
Packet type p
Program packet
Program type
Download process program
(exclusive for downloading time)
Address information
Address A00000h
Size information
50000 h bytes
Program main body
Download process program
(b)
(for normal type)
(c)
Non-download process program
FIG. 4
Boot process program region
Boot process program
Download process program region
Download process program
Non-download process program
Non-download process program region
Non-download process program
(Normal time)
Temporary download process program
(State 1)
New non-download process program
FIG. 5
Version information
FIG. 6
Product information
FIG. 7
User information
FIG. 9
Check sum information

What is claimed is:

1. A method of a remote program downloading system for updating control software of a terminal, wherein said control software includes a first program, said first program being a download process program, and a second program, said second program being another program and font data, said first program and said second program being stored in regions of EEPROM, and an updated control software includes a third program, said third program being a updated download process program and a fourth program said fourth program being another updated program and updated font data, the method comprising the steps of:

(a) downloading a temporary download process program directly into the EEPROM memory by using the first program and storing said temporary download process program in a memory region of the second program;

(b) downloading the third program program directly into the EEPROM memory by using the temporary download process program and storing said third program in a memory region outside the memory region of the temporary download process program; and (c) downloading the fourth program directly into the EEPROM memory by using the third program and storing said fourth program in a memory region outside the memory region of the third program.

2. The method according to claim 1 wherein the step (a) is preceded by the step of:

receiving instructions from a terminal operator.

3. The method of claim 1, wherein step (a), is preceded by the steps of;

comparing a plurality of terminal information to a plurality of updated control software information of an updated control software, wherein said updated control software information includes a plurality of product information, user information and version information, and selecting an updated control software to be downloaded.

4. The method of claim 1, wherein step (c) is followed by the steps of:

verifying the fourth program, and transmitting the result of said verifying to the host system.

5. The method of claim 1, wherein step (c) is followed by the steps of:

executing a maintenance control program, and transmitting a result of said executing to the host system.

6. A remote program downloading apparatus for updating a control software of a terminal, wherein said control software includes a first program, said first program being a download process program and a second program, said second being program being another program and font data, said first program and said second program being stored in regions of EEPROM memory, and an updated control software includes a third program, said third program being an updated download process program and a fourth program, said fourth program being another updated program and updated font data, the apparatus comprising:

data receiving means for receiving a data packet transmitted from a host system through a digital transmission channel;

program acquiring means for interpreting said data packet, and acquiring from said data packet a program specified by state control means by using a download process program specified by state control means, and;

program storing means for storing said program acquired from said data packet in a memory region specified by state control means; and issuing a completion of downloading signal after storing said program acquired from said data packet;

state holding means for holding a downloading state while downloading a program;

state control means for specifying a download process program and a program to be acquired to said program acquiring means, and a memory region to be used by said program storing means, according to said downloading state;

in a first downloading state, specifying the first program as said download process program, the temporary download process program as said program to be acquired and a memory region of the second program as said memory region to be used, in a second downloading state, specifying the temporary download process program as said download process program, the third program as said program to be acquired and a memory region outside of the temporary download process program as said memory region to be used, and in a third downloading state, specifying the third program as said download process program, the fourth program as said program to be acquired and a memory region outside of the third program as said memory region to be used, and;

in a normal state, specifying the fourth programs as said download process program and;

download starting means for changing the downloading state in said state holding means from a normal state to a first downloading state, when accepting a starting request, and, to a second downloading state if the downloading state in said state holding means is a first downloading state, to a third downloading state if the downloading state in state holding means is a second downloading state, and to a normal state if the downloading state in said state holding means is a third downloading state when said completion of download signal is received from the program storing means, and, activating said program acquiring means.

7. The apparatus of claim 6, further comprising event input means for detecting a program download request from an apparatus operator and giving a start request to said download starting means.

8. The remote program downloading apparatus of claim 6, further comprising;

automatic updating means for obtaining program control information of an updated control software from said program acquiring means, wherein said program control information of the updated control software includes a plurality of product information, user information and version information, comparing terminal information to said program control information of the updated control software, and sending a start request to said download starting means when the terminal information coincides with said information of the updated control software.

9. The apparatus of claim 6, further comprising:

verification result transmitting means for verifying the downloaded program at the end downloading before the downloading state is changed by the download starting means, and transmitting the result of said verifying to the host system.

10. The apparatus of claim 6, further comprising;

maintenance control means for controlling maintenance, and transmitting a result of said maintenance to the host if the data packet interpreted by the data acquiring means is a data packet for maintenance control.

\* \* \* \* \*

UNITED STATES PATENT AND TRADEMARK OFFICE
CERTIFICATE OF CORRECTION

PATENT NO.     : 6,266,810 B1
DATED          : July 24, 2001
INVENTOR(S)    : Tanaka et al.

It is certified that error appears in the above-identified patent and that said Letters Patent is hereby corrected as shown below:

<u>Title page,</u>
Item [56], References Cited, FOREIGN PATENT DOCUMENTS, insert
-- 8-195952          7/1996          (JP) --.

Signed and Sealed this

Twenty-fifth Day of March, 2003

JAMES E. ROGAN
*Director of the United States Patent and Trademark Office*